United States Patent Office 3,157,560
Patented Nov. 17, 1964

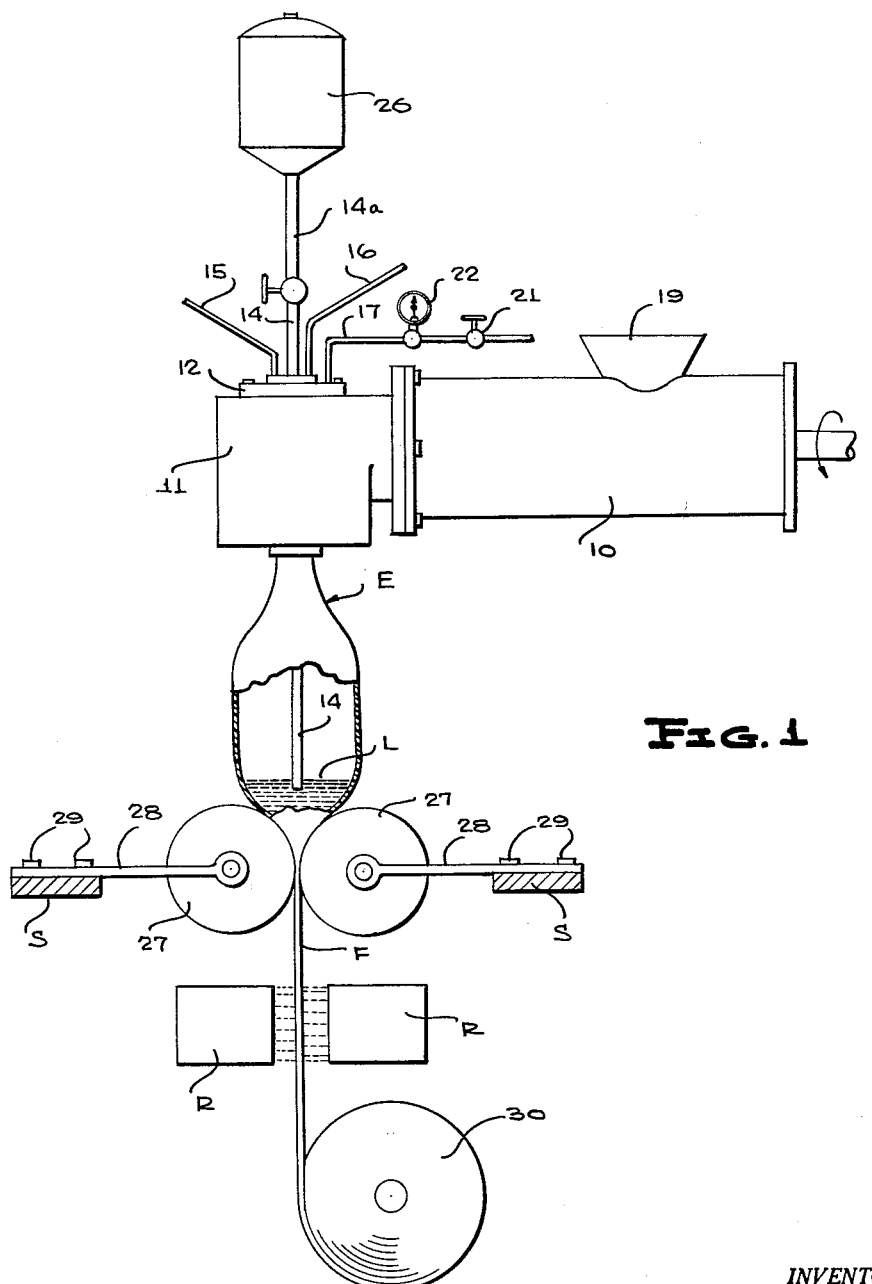

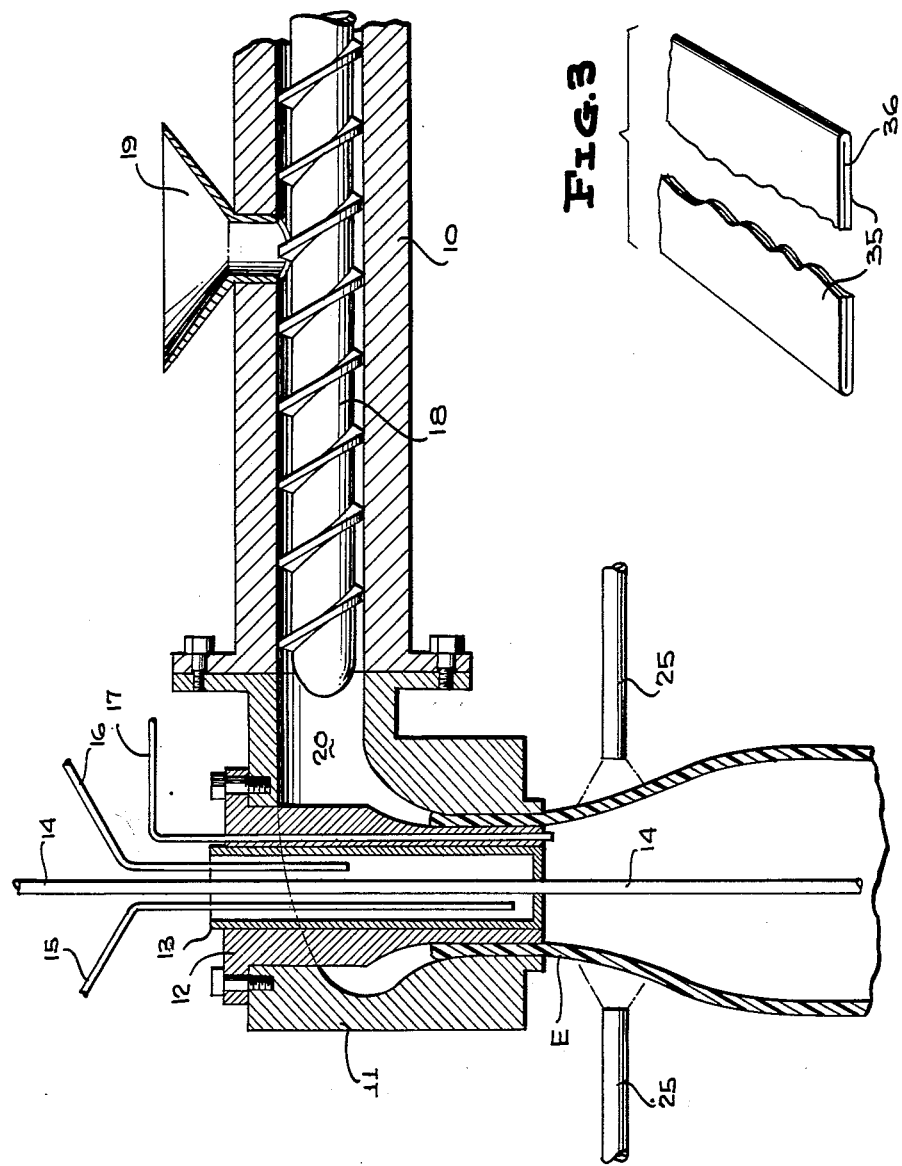

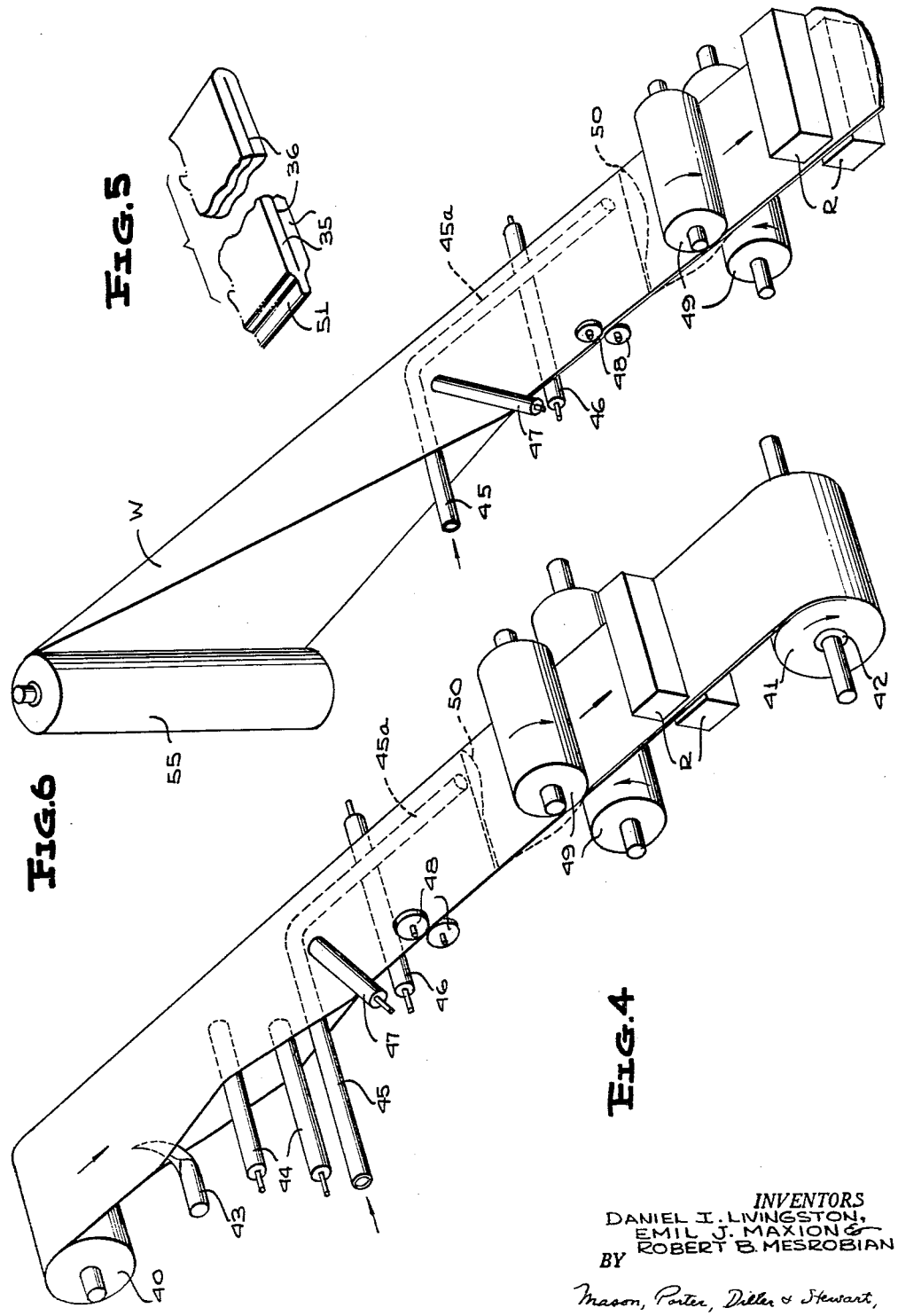

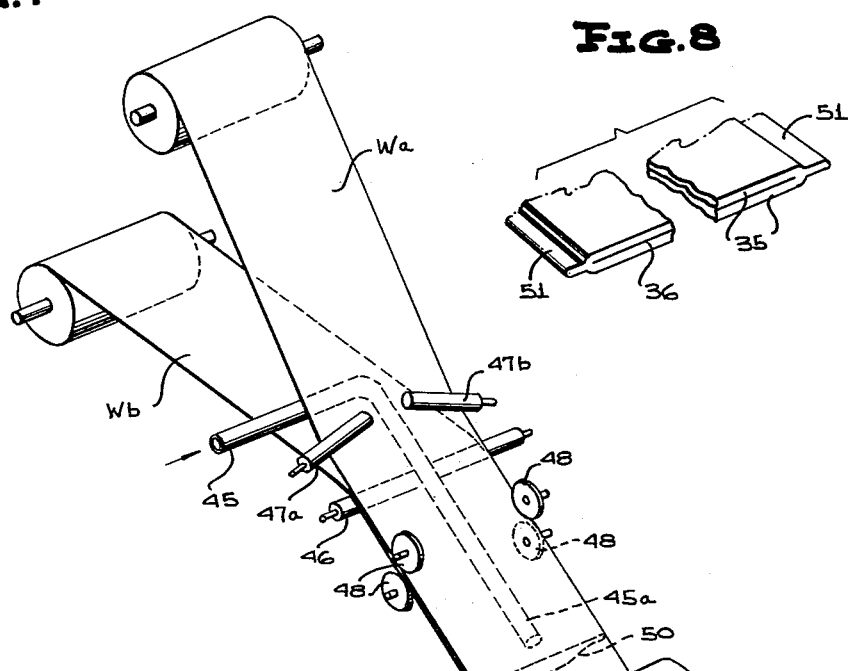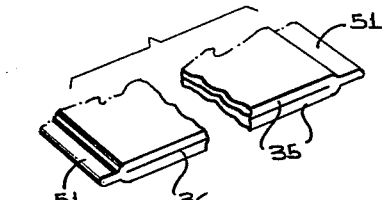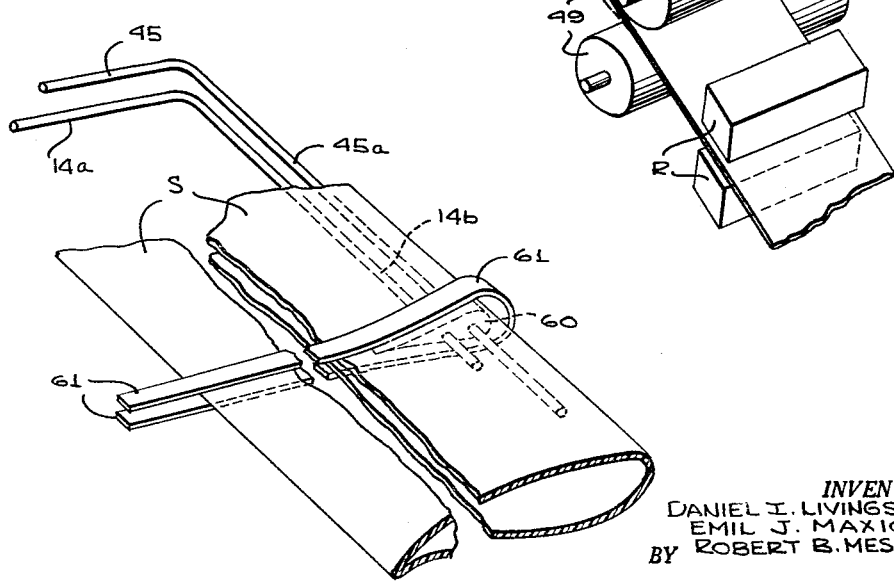

3,157,560
METHOD AND APPARATUS FOR MAKING LAMI-
NATE STRUCTURES AND PRODUCT THEREOF
Daniel I. Livingston, Akron, Ohio, and Emil J. Maxion,
Park Forest, and Robert B. Mesrobian, Hinsdale, Ill.,
assignors to Continental Can Company, Inc., New York,
N.Y., a corporation of New York
Filed Dec. 22, 1960, Ser. No. 77,552
26 Claims. (Cl. 161—106)

This invention relates to laminate structures in which an intermediate film is adherently present between exterior films, and to the preparation of the same.

It has been a practice to prepare laminates having layers of differing characteristics by applying to a substrate a coating of dissolved material which is to provide a second layer in the laminate. Thus, a film of cellophane plastic can receive a coating which upon drying provides a moisture-resistant and heat-sealable laminate structure: and polyethylene films can be made relatively impermeable to air. Such employment of solution coating procedures has the disadvantages of preparing the coating, usually itself a polymer, by a separate preliminary operation, dissolution in a suitable solvent, the cost of such solvent, and the cost of recovering it upon drying the coating layer.

It has also been a practice to apply a coating to a film of plastic material by preparing a hot-melt of a suitable polymer. Such practices have the disadvantage that the thickness of the coating is limited to a minimum of 0.0005 to 0.001 inch, whereas thicknesses of 0.0001 inch are sufficient in many cases: and therewith the employment of satisfactory but expensive coating agents is excluded for economy reasons. Further, only materials having suitable melt, flow and thermal stability properties can be employed.

Both techniques are limited to employment of substrates and coatings which adhere satisfactorily, or incur the expense of providing a third or intermediate film which effects the adhesive bond, at the increased cost of the double coating procedure and the expense of the material used.

According to the present invention, a laminate structure is prepared in which the use of solvents and of melt-coating procedures is avoided, and the need for bond-promoting materials is eliminated or materially reduced. It comprises the provision of a thin film of ethylenically unsaturated polymerizable organic material upon a polymeric substrate, and the conversion of this film into a final resin by the action of suitable radiation, wherewith bonding adhesion is developed.

In the practice of the invention, the polymerizable material can be excluded from contact with the air as an incident of the process; and the polymerizable material can be caused to effect grafting onto the material of the substrate, e.g., by covalent chemical bonds, so that an intermediate polymer is produced for functioning as an adhesion layer.

Many graft copolymers may be produced by the method, in which a polymerizable material is irradiated in the presence of a compatible polymeric substrate. For example, when the polymeric substrate is permeable to a polymerizable liquid monomer being employed, a bulk grafting occurs: and where impermeable, a surface grafting occurs. The presence of a surface graft is manifested by changes in the properties such as wettability, adhesion, and coefficient of friction. Wherever a reactive site is produced on the polymeric substrate by the breaking of a chemical bond, the possibility of initiating interpolymerization exists. Grafts of many materials have bee prepared, e.g., with styrene, vinyl acetate, acrylonitrile, vinylidene chloride, vinyl carbazole, vinyl pyridine, vinyl pyrrolidone, and the like, upon substrates such as polyethylene; styrene, vinyl acetate, acrylonitrile, vinylidene chloride, vinyl pyrrolidone and the like, have been grafted to polypropylene; acrylonitrile has been grafted to polyvinyl alcohol; styrene to the fluorocarbon polymer material sold under the trademark Teflon; and other composites prepared. Such substrates may be defined as having surfaces presented for bonding and grafting which are composed of hydrocarbon polymers, halohydrocarbon polymers, vinyl polymers, such as the halides, esters, alcohols, in homopolymer and copolymer form and including the vinylidene compounds, regenerated cellulose, and cellulose esters.

Vinylidene chloride copolymers containing more than about fifty percent of vinylidene chloride have been found excellently adapted, as radiation-polymerized unsaturated organic compounds, for employment herein. Such copolymers which contain minority amounts of vinyl chloride or acrylonitrile have an advantage, in many employments, over the vinylidene chloride homopolymer, that there is little or no crystallization and embrittlement: such copolymer films are mechanically tough and have excellent resistance against the permeation of greases, chemicals, water, air and oxygen. Thin laminates including such cured copolymers as a component are flexible and excellently adapted as a package wrapping for foodstuffs.

In general, it is preferred to introduce the polymerizable liquid in a form free of polymerization inhibitor, or having a low concentration of such inhibitor, e.g., less than 0.1 percent of such inhibitors as hydroquinone or hydroquinone ethers, which are frequently present in commercial monomeric or low polymeric substances of the sort for preventing premature polymerization. Polymerization catalysts may be included for their own accelerating effect, or to offset inhibitors: but their presence is not compulsory. More extensive cross-linking and grafting occurs when the polymerizable material is cured in contact with the substrate by irradiation than when the polymerization is effected solely by catalysts such as benzoyl peroxide or 2-azo-bis-isobutyronitrile with or without heating; with the advantage that catalyst fragments need not be present. When the catalysts are present, the apparatus described herein permits continuous production with a greater cross-linkage and grafting by reason of the radiation than if the catalysts only were required to accomplish the curing and adhesion.

The polymerizable liquid need not be purely a monomer. Commercial liquid materials containing low weight polymers can be employed. Liquid low weight polymers can be used as such, and in solution or mixture with monomers.

The curing of such liquid polymerizable materials can be effected by radiation at dosages which do not degrade the substrate and injure its mechanical properties. For example, with a cellophane or regenerated cellulose substrate, the grafting or copolymerization of the cellophane with polymerizable ethylenically unsaturated organic materials can readily be achieved without degradation through chain cleavage mechanism.

The radiation employed, and its dosage, is selected for the materials present. Ultraviolet light may be employed to effect the polymerization reaction, particularly in the presence of activators such as benzophenone, xanthone, 1-chloroanthraquinone, cis- and trans-stilbenes and dyestuffs known to the art of polymerization of the materials such as C.I. vat orange 18, C.I. vat yellow 24, C.I. vat yellow 2, C.I. vat green 1 and C.I. vat brown 49. The radiation may be of ionizing type, either particulate or electromagnetic, inclusive of high energy electrons, positive ions, neutrons, X-rays and gamma rays.

It is known that large dosages of radiation are effective to cause such cross-linking of certain plastics, e.g., polyethylene, so that they are no longer thermoplastic; whereas others, such as polypropylene, are largely degraded. It has been found that dosages, of the order here required for the curing and graft-bonding, do not significantly modify the desirable properties of mechanical strength and heat-sealability of such polymeric substrates. Thus electron exposure at energy values of 0.2 to 5 mev., a dose rate of 0.1 to 75 megarads per minute, and a total dose of 0.5 to 50 megarads can be employed: and corresponding high energy gamma ray exposures at dose rates up to 5 megarads per hour.

Polyethylene (linear or branched type) and polypropylene are the presently preferred substrate materials, by reason of their properties and cost. In general, the polymers of ethylene, alpha-olefins, and 1,3-dienes are usable. High density polyethylene and isotactic polypropylene are especially desirable for construction and packaging employments. Copolymers can be employed, e.g., copolymers of two or more aplha-olefins or conjugated dienes; noting the presence of a few percent of butene-1 in high density polyethylene acts to overcome stress-cracking. Such are herein termed "ethylenically unsaturated polymerizable organic materials." We prefer, however, to carry out the process with gamma rays and high energy electrons. It is particulalry beneficial to avoid air contact and the loss of volatiles during the irradiation. Thus, confinement between a substrate and another gas impermeable film is desirable. A preferred way of accomplishing this is to prepare an enclosure of the substrate material, as a tube or envelope, and to introduce the polymerizable material into the enclosure. When a thin flexible laminate sheet is the desired product, the charged tube or envelope may be flat and brought to a uniform total thickness, before the irradiation, by passage through a metering slot or between rolls held at the metered distance.

Sheets of the laminate may thus be prepared as "sandwiches" by flattening a plastic tubing having a wall thickness of 0.001 to 0.002 inch, and heat-sealing one end. The polymerizable liquid is introduced and spread within the tubing: and any air present is removed by re-flattening, e.g., by passing between rolls at a calibrated distance apart. The other end is then heat-sealed. The assembly is then irradiated to effect the grafting and resinification. The original tube may, for example, be one to twenty inches in diameter; and the product will be about 1½ to 30 inches wide.

A two-layer laminate may be prepared, with air exclusion, by forming a film of the polymerizable liquid between the substrate sheet and a metal body, and irradiating through the substrate. In cases where the polymerizable material includes a component which tends to volatilize by the heating side-effects of the radiation, the metal body may be cooled, e.g., by passage of cooling liquid therethrough. After curing, the composite is stripped from the metal as a laminate structure.

Example 1

A six inch length of polyethylene tubing of six inches diameter and 0.0015 inch wall thickness was flattened and heat-sealed at both ends. The envelope was punctured and pure vinyl acetate monomer was introduced. The air was displaced and the monomer adjusted to a uniform thickness of 0.0003 inch by passing the envelope through a slot adjusted to 0.0033 inch. The envelope was re-sealed, and irradiated with an electron beam at two million electron volts (mev.) to a dosage of 6 megarads at a dose rate of 0.68 megarad per minute. The liquid film became a polymerized, strongly adherent resin. The product was a coherent sheet six inches by about 9½ inches, and 0.0033 inch thick.

Example II

A like polyethylene tubing to that of Example I was used: and vinyl pyrrolidone monomer was injected. Irradiation was by an electron beam at two million electron volts, with a dosage of 20 megarads at an intensity of 63 megarads per minute. A firmly adhered laminate was obtained, with a slight odor of monomer.

Example III

An envelope was prepared and filled as in Example II; and irradiated with an electron beam at 2 mev. to a dosage of 6 megarads at the rate of 0.68 megarad per minute. A firmly adhered polymer laminate was produced with no odor of monomer.

Example IV

An envelope was prepared and filled as in Example I; but with employment of a vinyl acetate and vinyl pyrrolidone monomer mixture containing 10 percent by weight of the vinyl pyrrolidone. Irradiation was by an electron beam at 2 mev. to a dosage of 6 megarads at a dose rate of 0.68 megarad per minute. A coherent laminate structure very similar to that of Example I was obtained.

Example V

An envelope as in Example I was charged with a vinylidene chloride and acrylonitrile monomer mixture containing 11 percent by weight of the acrylonitrile was employed; each monomer being previously freed from inhibitor by distillation. Irradiation was by an electron beam at 2 mev. to a dosage of 6 megarads at the rate of 0.68 megarad per minute. A coherent laminate structure with polyethylene surfacings and an inter-film of vinylidene chlorideacrylonitrile copolymer resin was obtained.

Example VI

An envelope was prepared from two sheets of polypropylene film, six inches square and 0.001 inch thick, by heat-sealing the four edges. The vinylidene chloride and acrylonitrile mixture of Example V was introduced through a puncture, and the envelope resealed and brought to uniform thickness as in the above examples. Irradiation was by an electron beam at 2 mev. to a dosage of 6 megarads at the rate of 0.68 megarad per minute. The product was a coherent laminate.

Example VII

A polyester solution in a curable monomer can be employed.

A polyester was prepared by heating substances together in the ratio of one mole of maleic anhydride, one mole of phthalic anhydride and two moles of propylene glycol, all of commercial grade, using a three-necked flask and a temperature of about 170 degrees C.; with stirring throughout the course of the reaction, and with a stream of nitrogen being bubbled through the melt. The aqueous distillate was condensed and discarded. When the acid number had fallen to about 5, corresponding to a number average molecular weight of about 10,000, styrene was blended with the polyester product to give a solution containing 35 percent by weight of styrene. The styrene used was of commercial grade, and was prepared by fresh distillation under reduced pressure to remove inhibitor present. The solution had a viscosity of about 2,500 centipoises.

This solution was employed in a polyethylene envelope as in Example I. The envelope was resealed and irradiated by an electron beam at 2 mev. to a dosage of 10 megarads at a dose rate of 0.68 megarad per minute. The liquid film became polymerized, and a coherent laminate was obtained.

Example VIII

Envelopes of regenerated cellulose, or cellophane, with an inner coating of a cellulose ester, e.g., nitrocellulose, were prepared with a filling of a mixture of 89 percent of vinylidene chloride and 11 percent of acrylonitrile, and irradiated by means of a cobalt-60 gamma ray source at a dose rate of 2.5 megarads per hour. Envelopes which received doses of 2.5 and 3.8 megarads exhibited an adherent layer of polymer film.

In general, the substrates are preferably in the range of 0.5 to 20 mils in thickness. The interfilms are preferably in the range of 0.1 to 10 mils. It is notable from Examples II and III that high dose rates are much less efficient than low dose rates, even with a higher total dosage.

The procedure permits the use of apparatus for the continuous production of laminate strip material. Such apparatus is conventionally shown in the accompanying drawings, in which:

FIGURE 1 is an apparatus including an extruder and means for supplying polymerizable material into an extruded tubing, shaping the same into a strip, and curing the material, according to this invention;

FIGURE 2 is a detailed sectional view, on a larger scale, of the extruder structure of FIGURE 1;

FIGURE 3 is a perspective view, with central parts broken away, of the laminated structure produced by the apparatus of FIGURE 1;

FIGURE 4 is a perspective view of a second form of apparatus;

FIGURE 5 is a perspective view resembling FIGURE 3, and showing the product of the apparatus of FIGURE 4;

FIGURE 6 is a perspective view of a third form of apparatus;

FIGURE 7 is a perspective view of a fourth form of apparatus;

FIGURE 8 is a perspective view resembling FIGURE 3, and showing the product of the apparatus of FIGURE 7;

FIGURE 9 is a perspective view, representing a part of the tubing as made in FIGURES 4, 6 or 7, and showing air control means.

In FIGURES 1 and 2, an extruder 10 receives a polymer plastic material, such as polyethylene, which is to provide the outer layers or substrata of the laminate material to be made. The head 11 of the extruder is provided with a core member 12 so that a tubular extrudate E is formed. The core member 12, FIGURE 2, has a fixed internal cup 13, sealed at its bottom around a valved supply pipe 14 and connected for the reception and removal of a cooling fluid by the ducts 15, 16 so that the polymerizable material delivered through the pipe 14 is kept cool. Preferably, the cup 13 is of heat-insulating material. A gas supply duct 17 leads through the core member 12 so that a gas can be delivered into the internal space of the extrudate E. The extruder 10 includes a rotatable worm 18 by which the softened plastic is forced from the feeding region at the hopper 19 toward and into the head 11. Therewith, the plastic is under pressure in the head space 20 and is delivered around the core member 12 to form the extrudate E.

The gas is supplied to duct 17 under pressure, and is controlled by a valve 21 and a gage 22. The gas establishes a pressure inside the energizing soft plastic, and distends the extrudate E and thins its wall. The plastic is cooled so that the dilated tubing is essentially solidified into a form-maintaining flexible condition. Gas from jet nozzles 25 may assist in the cooling. The duct 14 extends into the dilated tubing and is connected by a valved pipe 14a with a supply reservoir 26 of the liquid polymerizable material which is to form the intermediate layer of the laminate material, under a pressure effective in the dilated tubing to assure a regular delivery against the gas pressure therein, for providing a pool of such liquid in the tubing e.g., to the level L therein.

The dilated extrudate E, with the liquid therein, is passed through metering rolls 27 which change the circular section to a flattened form F; the spacing between the peripheries of the metering rolls being set at a distance corresponding to two wall thicknesses of the tubing plus the desired thickness of the intermediate layer of the laminate material. Illustratively, the rolls 27 may be supported on journal brackets 28 which can be moved toward and from one another relative to the general support S and held at the metered relative position by the bolts 29. The action of the rolls maintains the pool P of liquid in the portion of the tubing which has not been flattened by the rolls, less the amount which provides the intermediate layer; and this latter amount is regularly replaced through the pipe 14. The pipe 14 is shown as extending to below the level L, for preventing bubbles being formed as the replacement polymerizable liquid enters.

The flattened tubing F, with the film of liquid between its walls, is advanced to a polymerization zone, where it is subjected to radiation effects, as by the radiation sources R. After polymerization bonding by the intermediate layer in response to the radiation, the laminate is collected on a take-up roll 30.

The extruder 10 can deliver a tubing of 4 inches external diameter, with a wall thickness of 0.003 inch which is distended to an external diameter of 12 inches and a wall thickness of 0.001 inch, and cooled. The liquid for the intermediate layer is introduced, and the circular extrudate cylinder E is then passed through the metering rolls 20 set at 0.0021 inch spacing, so that the flattening tubing is about 18 inches wide, with outer lamination layers 0.001 inch thick and an intermediate layer 0.0001 inch thick. Upon radiation curing, the product is a web about 18 inches wide and 0.0011 inch thick, having rounded edges as shown in FIGURE 3, with outer layers 35 illustratively of polyethylene 0.001 inch thick, and an intermediate strongly bonded layer 36, illustratively of vinyl acetate, about 0.0001 inch thick. By resetting the metering rolls 27 at 0.0025 inch, the laminate product has outer layers 35 which are 0.001 inch thick and an intermediate layer 36 which is 0.0005 inch thick.

Polyethylene is heated in the extruder cylinder to a temperature of 300 to 450 degrees F., and issues as the tubing E at a like temperature. Preferably, it is reduced to about 250 degrees F. before it comes to the rolls 27. The gas brought through the pipe 17 should be inert to the tubing material: nitrogen gas or a noble gas may be employed, noting that there is little loss of such gas during the continuous operation, due to low solubility and lack of chemical effect in the polymerizable material and its low rate of acceptance by the tubing material.

In the form of practice shown in FIGURE 4, a preformed flat tubing of the outer or substrate stock is taken from a supply coil 40 or an extruder and moved continuously forward and taken up as a coil 41 of laminate stock on a driven drum 42. During its travel, it is slitted by a knife 43 and the two sides are led past the opening rollers 44 which dilate it as it goes past the feeder duct 45 through which the polymerizable liquid flows into the space between the sides, preferably being deposited adjacent the bight of the slit tubing. The tubing then passes between the re-closing rolls 46, 47: the bottom roll 46 preferably extends beneath the width of the material to provide a support for the tubing; while the upper roll 47 extends for a part of the width, to avoid pressure upon the material against the supply duct 45 which preferably has a portion 45a extending parallel to the bight. Heat-sealing rollers 48 engage the margins adjacent the slot, and re-seal the tubing, preferably at a point relatively unstreamward of the discharge end of the supply duct 45a. The re-sealed tubing, with the polymerizable liquid therein, is then led between the metering rolls 49 which preferably are rotated against the direction of tubing movement, as shown by the arrows. Therewith, a body of the polymerizable material is formed within the re-sealed tubing, in advance of the roll nip, for assuring uniform lateral distribution of the liquid: the tubing is distended thereby as shown at 50. It will be understood that the amount of distension has been exaggerated in the drawing, to indicate the effect: noting that with tubing having a width, say, of 20 inches and a wall thickness of 0.001 inch, and an intended middle film of, say 0.0001 inch, the actual distension may be less than a few hundredths of an inch. The tubing F then passes between the irradiating devices R; and then to the take-up.

The product of the apparatus and procedure of FIGURE 4 is shown in FIGURE 5. It is like that of FIGURE 3; except that the sealed portion 51 is present along one edge.

In FIGURE 6, a web or film W is drawn from a supply such as the coil 55 or an extruder: and is then folded along its length so that the edges are aligned. This illustratively is accomplished by drawing the web between the closing rolls 46, 47 which are downstreamward of the supply duct 45 for the polymerizable liquid, and the duct extension 45a delivers the liquid between the two sides of the folded web at a point downstreamward of the heat-sealing rollers 48 which join the margins of the web. Thereafter, the material moves between the metering rolls 49 and the irradiation devices R as in FIGURE 4. The product is as in FIGURE 5.

In FIGURE 7, webs Wa and Wb are delivered from two sources such as the supply coils shown, and are brought together at the closing rollers 46, 47a, 47b, with the upper rollers 47a, 47b extending from opposite edges of the webs and leaving a space between their adjacent ends, for the bent duct 45a of the supply duct 45 for the liquid polymerizable material. Pairs of heat-sealing rollers 48 join the margins of the webs Wa and Wb at points upstreamward of the end of duct 45a. Thereafter, the webs, with their edges sealed together and with the liquid therein, pass between the metering rolls 49 and the irradiation devices R as before. The product is shown in FIGURE 8, being a coherent laminate with the surface layers 35 and the middle cured layer 36: each edge has a heat-sealed portion 51.

When the practices of FIGURES 4, 6 and 7 are performed with webs from coiled stock, there is no heating of the polymerizable liquid prior to irradiation, and the liquid can be cooled if desired. Therewith, no premature polymerization occurs before the liquid film has been brought to final thickness and position between the sides of the web material and comes to the irradiators R.

In the practices of FIGURES 4, 6 and 7, air which may enter during dilation of the tubing or which is present as the web sides are brought together, may be ejected by employing an inert gas as shown in FIGURE 9. This is desirable when the liquid is sensitively prone to premature polymerization. In FIGURE 9, the traveling strip S, with its two sides distended by the presence of the supply duct extension 45a and with its edges sealed, also has a gas supply duct 14a with an extension 14b which extends parallel to the duct extension 45a. A baffle 60 of generally triangular shape with a rounded end to fit the bight, embraces the duct members 45a and 14b to restrict the forward movement of air with the advancing tubing, by the contact of the outer surfaces of the baffle piece with the inner surfaces of the strip sides. The inert gas is delivered into the space between the strip sides, downstreamward of the baffle, and serves to dilate the tubing during its travel from the baffle to the metering rolls and thereby assist in the distribution of the liquid polymeric material. This gas can then escape relatively rearwardly, around the baffle and between the sides of the strip, establishing a plenum upstreamward of the baffle to exclude and expel air. The sides of the advancing strips are pressed toward one another at the region of the baffle by stationary bars 61 which are narrowly spaced from the upper, lower and end surfaces of the baffle; and extend above and below the part of the strip width, not occupied by the baffle, with a like spacing. The surfaces of the bars 61 toward the strip may be dressed with a high-pile fabric or with flat springs.

The metal parts of the baffle and of the springs which engage the strip may be coated with material of low frictional coefficient, such as the resin sold commercially under the trademark Teflon.

With liquid polymerizable materials which are not sensitive to air, the structure of FIGURE 9 may be employed with compressed air supply to the duct 14a, for accomplishing the dilation only.

The laminate structures produced, comprising layers of substrate and cured material bonded thereto, have the virtues of the respective impermeabilities of the layers. Thus a polymeric substrate of polyethylene is resistant to permeation by moisture vapor, but can pass hydrocarbon vapors: and a bonded intermediate barrier layer of a material resistant to hydrocarbon vapors and oxygen confers upon the laminate resistance to such types of vapors and gases. Such a flexible sheet material can be employed in packaging foodstuffs which contain water and a rancidifiable fat. In general, the laminate structures can be employed for flexible packages and wrappings, and in building construction, where impermeability to liquids, vapors and gases is desirable: and by employment of heat-sealable outer layers, the sheets may be joined by simple operations.

It is obvious that the invention is not limited to the illustrative embodiments of practice, and that it may be employed in many ways within the scope of the appended claims.

What is claimed is:

1. An article of manufacture comprising a layer of a polymer of an ethylenically unsaturated organic material having a thickness of 0.1 to 10 mils and in coherent relation thereto an envelope of a substrate material surrounding said layer on both flat sides and the lateral edges thereof and in graft relation thereto, said substrate material selected from the group consisting of hydrocarbon polymers, halohydrocarbon polymers, regenerated cellulose, and cellulose esters, and said layer grafted within said substrate by irradiation of strength equal to a beta radiation source of 0.2 to 5 mev.

2. The method of preparing a laminate structure, which comprises applying to a substrate film selected from the group consisting of hydrocarbon polymers, halohydrocarbon polymers, vinyl polymers and cellophane a liquid layer of a polymerizable ethylenically unsaturated organic material, in the absence of a non-polymerizable solvent, and subjecting the layer to ionizing radiation of strength equal to a beta radiation source of 0.2 to 5 mev. for effecting a curing of the same while excluding air from the said layer, the said layer having a thickness of 0.1 to 10 mils.

3. The method as in claim 2, in which the radiation is passed through the substrate and the substrate has a thickness of 0.5 to 20 mils.

4. The method of preparing a laminate structure, which comprises preparing an envelope from a substrate film having its inner surface provided by a substrate selected from the group consisting of hydrocarbon polymers, halohydrocarbon polymers, vinyl polymers, regenerated cellulose and cellulose esters, and having a film thickness of 0.5 to 20 mils, introducing into the envelope a liquid comprising a polymerizable ethylenically unsaturated organic material in the absence of non-polymerizable solvent, forming the liquid into a layer having an essentially uniform thickness of 0.1 to 10 mils and in contact with the inner surfaces of the envelope and excluding air therefrom, and subjecting the filled envelope to ionizing radiation of strength equal to a beta radiation source of 0.2 to 5 mev. for effecting a grafting of the said organic material at the inner surface of the envelope and a curing of such material to provide an adherent interfilm.

5. The method as in claim 2, in which the envelope is formed by extruding the substrate material as a tubing.

6. The method as in claim 2, in which the envelope is formed by folding a sheet of the substrate material, in which the liquid unsaturated polymerizable material is introduced between the free edges of the sheet, and in which the free edges are sealed together before the liquid is formed into the said layer.

7. The method as in claim 2, in which the envelope is formed by bringing two sheets of the substrate material into face-to-face relation, in which the liquid unsaturated polymerizable material is introduced between the sheets, and in which the free edges of the sheets are sealed together before the liquid is formed into the said layer.

8. The method as in claim 2, in which the envelope is formed by continuously extruding the substrate substance into a tubing, dilating the tubing and flattening it, and introducing the liquid unsaturated polymerizable material into the tubing while dilated and before flattening whereby to form a mass which expels gas from the tubing while being flattened.

9. The method as in claim 8, in which the liquid unsaturated polymerizable material is maintained cool and is introduced through the tubing as formed by the extrusion and before dilation thereof.

10. The method as in claim 4, in which the liquid unsaturated polymerizable material is vinyl acetate.

11. The method as in claim 4, in which the liquid unsaturated polymerizable material is vinyl pyrrolidone monomer.

12. The method as in claim 4, in which the liquid unsaturated polymerizable material is a mixture of vinyl acetate and vinyl pyrrolidone.

13. The method as in claim 4, in which the liquid unsaturated polymerizable material is a mixture of vinylidene chloride and acrylonitrile.

14. The method as in claim 4, in which the liquid unsaturated polymerizable material is a low molecular polyester dissolved in styrene.

15. The method as in claim 4, in which the substrate film is of polyethylene.

16. The method as in claim 4, in which the substrate film is of polypropylene.

17. The method as in claim 4, in which the substrate film is of regenerated cellulose coated with a cellulose ester.

18. The method of preparing a laminate structure, which comprises preparing an envelope from a substrate film having its inner surface provided by a substrate selected from the group consisting of hydrocarbon polymers, halohydrocarbon polymers, vinyl polymers, regenerated cellulose, and cellulose esters, and having a film thickness of 0.5 to 20 mils, introducing into the envelope an ethylenically unsaturated polymerizable liquid organic material in the absence of non-polymerizable solvent, spreading the material to a layer of essentially uniform thickness of 0.1 to 10 mils and in contact with the internal surfaces of the envelope and removing air from within the envelope, and subjecting the filled envelope to ionizing radiation of strength equal to a beta radiation source of 0.2 to 5 mev. for effecting a curing of the unsaturated filling material and adhesion thereof to the envelope film.

19. The method as in claim 18, in which the envelope is prepared as a tubing, the unsaturated polymerizable filling is introduced into the tubing, and the tubing is then flattened for distributing the filling and expelling air, and for bringing the layer to the said thickness.

20. An apparatus for forming a laminate from a substrate material selected from the group consisting of hydrocarbon polymers, halohydrocarbon polymers, regenerated cellulose, and cellulose esters, comprising means for forming an envelope from said substrate material, means including a nozzle for introducing into the envelope an ethylenically unsaturated polymerizable organic material, means for flattening the envelope with the material therein whereby to shape such material as a layer of essentially uniform thickness and expel gases, and means for subjecting the filled and flattened envelope to ionizing radiation.

21. An apparatus as in claim 20, in which the envelope forming means comprises a device for extruding the substrate material as a tubing, and the introducing means includes a conduit extending through the extruding device and leading to said nozzle for delivering the liquid polymerizable material into the tubing.

22. An apparatus as in claim 21, including means to dilate the extruded tubing, and in which the flattening means comprises opposed rollers, and in which the said nozzle is located inside the tubing adjacent the nip of the rollers.

23. An apparatus as in claim 21, in which the said extruding device has heating means for determining the viscosity of the substrate material, and a heat insulating jacket is provided around the said conduit.

24. An apparatus as in claim 20, in which the envelope forming means comprises devices for advancing a longitudinally folded sheet of the substrate material, devices extending between the folds for separating the same and including said nozzle, means for sealing the free edges of the sheet together upstreamward of the said nozzle by which the said liquid polymerizable material is delivered between the folds, and in which the said flattening means comprise opposed rollers located between the said nozzle and the said radiation means.

25. An apparatus as in claim 20, in which the envelope forming means comprises devices for advancing a sheet of the substrate material and folding the same longitudinally, devices extending between the folds for separating the same and including said nozzle, means for sealing the free edges of the sheet together upstreamward of said nozzle by which the said liquid polymerizable material is delivered between the folds, and in which the said flattening means comprise opposed rollers located between the said nozzle and the said radiation means.

26. An apparatus as in claim 20, in which the envelope forming means comprises devices for advancing two sheets of the substrate material and bringing them into superposed position, devices extending between the sheets for holding them separated at their centers of width and including said nozzle, means for sealing the sheets together at their free edges upstreamward of said nozzle, and in which the said flattening means comprise opposed rollers located between the said nozzle and the said radiation means.

References Cited in the file of this patent

UNITED STATES PATENTS

| 2,907,675 | Gaylord | Oct. 6, 1959 |
| 2,926,126 | Graham et al. | Feb. 23, 1960 |
| 2,940,869 | Graham | June 14, 1960 |
| 3,097,150 | Ranier et al. | July 9, 1963 |
| 3,101,276 | Hendricks | Aug. 20, 1963 |

FOREIGN PATENTS

| 797,615 | Great Britain | Jan. 6, 1955 |

OTHER REFERENCES

Lawton et al.: Nature vol. 172, pp. 76 and 77, July 11, 1953.